R. STIRLING, Jr.

FILLING NIPPLE AND ACCESSORY LOCK.

APPLICATION FILED APR. 14, 1921.

Reissued Oct. 31, 1922. 15,483.

2 SHEETS—SHEET 1.

Inventor

Robert Stirling, Jr.

By B. F. Porter

Attorney

R. STIRLING, Jr.

FILLING NIPPLE AND ACCESSORY LOCK.

APPLICATION FILED APR. 14, 1921.

Reissued Oct. 31, 1922. 15,483

2 SHEETS—SHEET 2.

Inventor

Robert Stirling, Jr.

By

Attorney

Reissued Oct. 31, 1922. Re. 15,483

UNITED STATES PATENT OFFICE.

ROBERT STIRLING, JR., OF EAST CHICAGO, INDIANA.

FILLING NIPPLE AND ACCESSORY LOCK.

Original No. 1,361,922, dated December 14, 1920, Serial No. 373,829, filed April 14, 1920. Application for reissue filed April 14, 1921. Serial No. 461,443.

*To all whom it may concern:*

Be it known that I, ROBERT STIRLING, JR., a citizen of the United States, residing at East Chicago, in the county of Lake and State of Indiana, have invented certain new and useful Improvements in Filling Nipples and Accessory Locks, of which the following is a specification.

As is well known, it is the custom to mount certain accessories, as for example, temperature indicators, in the filling nipple of the automobile radiator. As a consequence, it is necessary to remove these devices whenever the radiators are filled. Being removable, they are apt to be stolen, and moreover are often broken when removed for legitimate purposes, as in filling.

One of the primary objects of the present invention is to provide an attachment that can be placed on any well known type of filling nipple, and in which the accessory can be permanently secured, said attachment having means whereby the radiator can be filled without the necessity of removing the indicator.

A further object is to provide means that can be readily applied, and is effectively locked against unwarranted removal.

A still further object is to so position the filling opening that it is readily accessible, and will permit the radiator to be filled with greater convenience than is the case with the vertically disposed nipple now in common use.

Several embodiments of the invention are illustrated in the accompanying drawings, but it will be understood that other forms and structures may be utilized within the scope of the appended claims.

In the drawings:—

Figure 1:
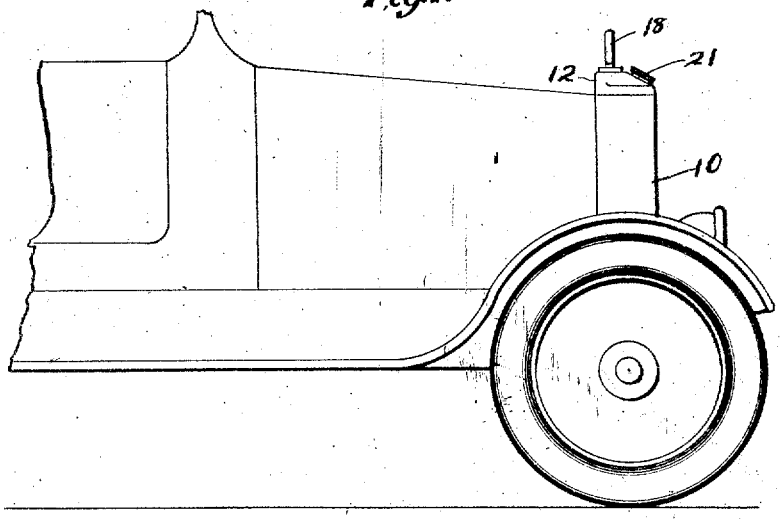
Figure 1 is a side elevation of the front portion of an automobile, showing one of the devices in place.
Figure 2:
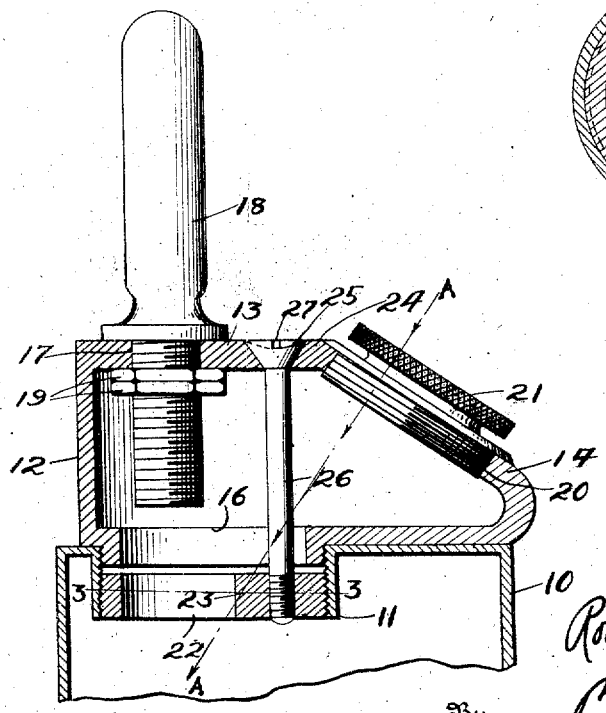
Figure 2 is a vertical sectional view on an enlarged scale through the attachment.
Figure 3:
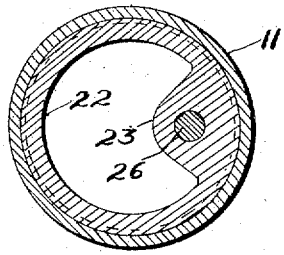
Figure 3 is a cross sectional view on the line 3—3 of Figure 2.

Referring first to the embodiment disclosed in Figures 1–4 inclusive, the radiator of the automobile is designated 10, and is provided with the usual internally threaded filling nipple 11. The accessory is in the form of a head 12 that rests upon the top of the radiator, and may be of any desired ornamental form or configuration. Said head has a top, comprising a substantially horizontal rear portion 13 and a downwardly and forwardly inclined front portion 14. The bottom 15 has on its rear portion a depending externally threaded boss 16 that screws into the nipple, as clearly shown in Figure 2. The horizontal portion 13 of the top is provided with an opening 17 adapted to receive the temperature indicator 18, or other accessory, which may be permanently fixed in place by any suitable means, as for example, lock nuts 19. The inclined portion 14 is provided with a filling opening 20 adapted to be covered by any desired form of closure, as for example, a screw plug 21.

Figure 4:
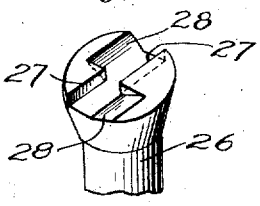
Figure 4 is a detail perspective view of the head of the connecting screw bolt.

For the purpose of effectively mounting the nipple member above described in place, an anchor member in the form of a collar 22 is threaded into the nipple 11, and is provided on one side with an internal lug 23 having a threaded opening. The horizontal portion 13 of the top is provided between the openings 17 and 20 with a tapered opening 24 adapted to receive the correspondingly shaped head 25 of a screw bolt 26 that is threaded into the opening of the lug 23. The head 25 of the screw, as shown in Figure 4, is notched, but said notch is provided with bearing shoulders 27 solely to engage a tool for the purpose of screwing the bolt into its locking position, the usual opposite shoulders being cut away, as illustrated at 28.

With this construction, it will be noted that the supplemental nipple, which can be produced as a complete article of manufacture, may be readily placed in position and effectively locked against removal. Furthermore when in position, the temperature indicator becomes a permanent part of the same and does not have to be removed when the radiator is filled. It, in turn, can be permanently secured in position. The filling opening moreover is placed close to the front of the radiator, and being set at an inclination, is more readily accessible, and the filling operation can be more conveniently performed than with the vertical nipple now commonly employed. Moreover the compact arrangement while permitting the temperature indicator being placed directly above the nipple also locates the intake opening 20 in such relation to the outlet opening in the boss 16 that a direct view can be obtained into the nipple 10 (as indicated by the line A) so that the level of the water can be observed.

Figure 5:
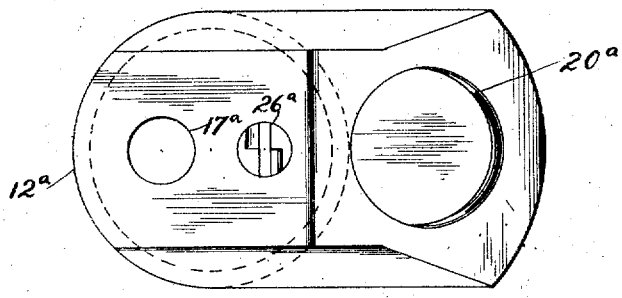
Figure 5 is a plan view of a slightly modified form of structure.
Figure 7:
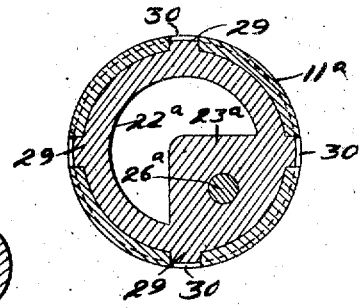
Figure 7 is a horizontal sectional view on the line 7—7 of Figure 6.
Figure 6:
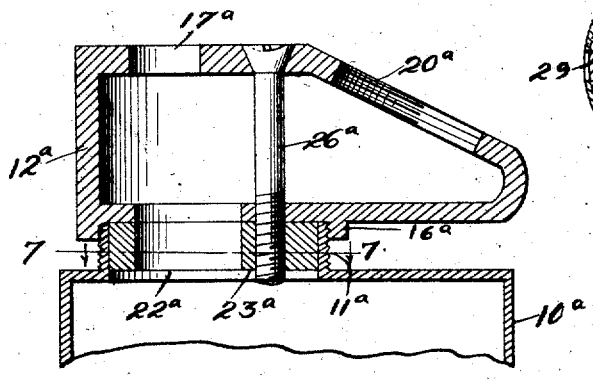
Figure 6 is a vertical sectional view therethrough.
Figure 9:
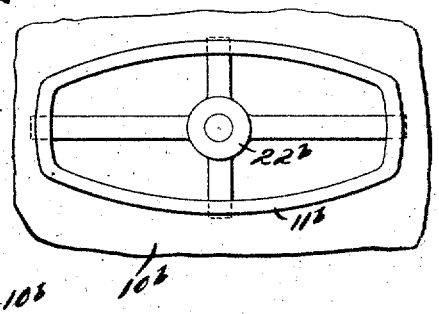
Figure 9 is a plan view of the anchor element illustrated in Figure 8, and showing the same in the standard nipple.
Figure 8:
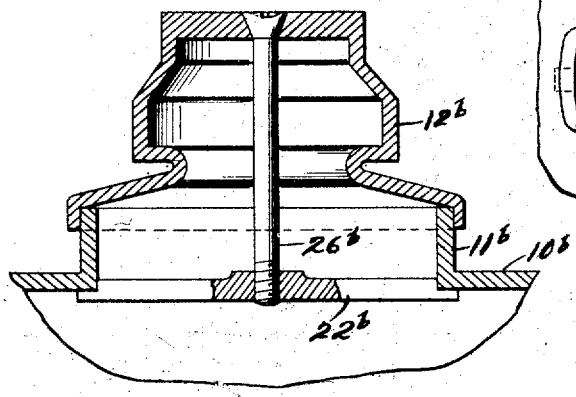
Figure 8 is a vertical sectional view through another embodiment of the invention.

The invention can be modified in various ways, so that it may be employed for different types of radiators, and in fact on other structures besides automobile radiators. Figures 5, 6 and 7 disclose an example of a different form of structure. In this embodiment, the radiator is designated $10^a$, and has an upstanding externally threaded nipple $11^a$. The nipple member $12^a$ has a depending internally threaded boss $16^a$ that is screwed upon the upper end of the nipple $11^a$. The top is provided with an opening $17^a$ to receive the accessory, and has a forwardly inclined portion provided with a filling opening $20^a$. The anchor member, designated $22^a$, fits within the nipple and has an internal lug $23^a$ to receive the connecting screw bolt $26^a$. In this embodiment the anchor element has outstanding lugs 29, and the nipple in this instance must be filed away to provide sockets, as 30 to receive the lugs. It will be clear that when the parts are assembled, as illustrated in Figure 6, the attachment is effectively held against removal, and thus has all the advantages of the structure illustrated in Figure 2.

Where the nipple is elongated and unthreaded as is sometimes the case, the structure disclosed in Figures 8 and 9 may be employed. In said figures a portion of the radiator is shown at $10^b$, and the upstanding elongated unthreaded nipple is illustrated at $11^b$. The nipple member $12^b$ is provided with a depending boss that fits over the nipple $11^b$. The anchor member is in the form of a spider $22^b$, the hub of which receives the locking screw $22^b$. The spider $26^b$ is engaged with the lower end of the nipple $11^b$, and the two members are connected by a bolt, as illustrated in Figure 8.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. A filling nipple having an upwardly disposed intake opening and a downwardly disposed outlet opening, said openings being offset from each other, an anchor element adapted to be interfitted with the container to which the nipple is to be applied, and a locking device that connects the nipple and anchor element to secure the former, said locking device extending into the outlet opening.

2. A filling nipple having a top, an upwardly disposed intake opening and a downwardly disposed outlet opening, said openings being offset from each other, an anchor element adapted to be placed beneath the nipple and interfitted with the container to which the nipple is to be applied, and a locking device that engages the top of the nipple, extends through the outlet opening and engages the anchor member.

3. A filling nipple having an internal chamber provided with an upper inlet opening and a lower outlet opening, said openings being offset from each other, an anchor member adapted to interfit with the container to which the nipple is applied, and a locking device that engages with the top of the nipple, extends through the chamber into the outlet opening and engages the anchor member to secure the nipple and member together.

4. A filling nipple member provided with an upper intake opening and a lower outlet opening offset from the inlet opening, a separate anchor member adapted to be detachably interfitted with the container to which the nipple member is to be applied, and a locking device for connecting the nipple member to the anchor member to secure the two together and thereby lock both members against removal from the container.

5. A filling nipple having a top provided with an intake opening and an accessory receiving opening spaced from the intake opening, said nipple having a bottom provided with an outlet opening that alines with the accessory receiving opening, an anchor member adapted to engage with a container to which the nipple is to be applied, and a locking device that engages with the top of the nipple and the anchor member through the outlet opening.

6. A filling nipple having an internal chamber provided with a lower outlet opening and an upper filling opening, a separate anchor member for detachably interfitting with the usual nipple below the nipple member, and a bolt for connecting the members to lock the nipple member in place and having means for permitting the operation of said bolt to connect the members but preventing its operation to effect their disconnection.

7. A filling nipple member having an offset filling opening, an anchor member for interfitting with the usual nipple, and a screw bolt passing through one of the members and having a threaded engagement with the other, said screw bolt having a head seated in the nipple member and provided with shoulders in a position to be engaged by a tool solely to couple the members.

8. A filling nipple member having a depending outlet boss to interfit with the usual nipple and having a head provided with an opening alined with the boss and adapted to receive a temperature indicator, said head having an offset portion provided with a filling opening, an anchor member adapted to interlock with the usual nipple, and a device for connecting the two members to secure the nipple member in place.

9. A filling nipple attachment for radiators comprising a hollow body adapted to fit upon the ordinary nipple of an automobile radiator and having a lower outlet opening that communicates therewith to permit the passage of water into said nipple, said body having a top provided with an inclined front portion, the top having an opening to receive the stem of an indicating instrument and the inclined portion having a water intake opening, said latter opening being offset from the outlet opening but sufficiently close thereto to permit a view through both of said openings and into the radiator nipple to which the attachment is applied, and a closure for the intake opening.

10. A filling nipple attachment for radiators comprising a hollow body adapted to fit upon the ordinary nipple of an automobile radiator and having a portion that interfits therewith, means for locking said body against removal from the radiator nipple, said body having a lower outlet opening that registers with the nipple opening to permit the passage of water into said nipple, said body having a lower outlet opening inclined front portion, the top having an opening to receive the stem of an indicating instrument and the inclined portion having a water intake opening, said latter opening being offset from the outlet opening but sufficiently close thereto to permit a view through both of said openings and into the radiator nipple to which the attachment is applied, and a closure for the intake opening.

11. A filling nipple attachment for radiators comprising a hollow body adapted to fit upon the ordinary nipple of an automobile radiator and having a boss that interfits with the radiator nipple and has threads that engage the threads of such nipple, means for positively locking the body against being unthreaded from the nipple, said body having a lower outlet opening that registers with the nipple opening to permit the passage of water into said nipple, said body having a top provided with an inclined front portion, the top having an opening to receive the stem of an indicating instrument, and the inclined portion having a water intake opening, said latter opening being offset from the outlet opening but sufficiently close to permit a view through both of said openings and into the radiator nipple to which the attachment is applied, and a closure for the intake opening.

12. In a filling nipple attachment for radiators, the combination with a hollow body having a portion adapted to interfit with the usual nipple of an automobile and having an outlet in said portion, said body having a top provided with an opening in substantial alinement with the outlet opening and adapted to receive the stem of a heat-indicator, a heat indicator on the body and having a stem passing through the opening, means on the inside of the body for irremovably locking the stem and indicator against detachment from the body, said body also having an intake opening at one side of the stem receiving opening, a closure for the latter opening, and means engaging the body for permanently locking said body in its interfitting relation on the nipple of a radiator to permanently hold the same and the heat indicator in place thereon, while permitting the filling of the radiator through the said intake opening, said means being inoperable by a tool and irremovably fixing the body to the nipple.

ROBERT STIRLING, Jr.